US012154482B2

(12) United States Patent
Sun et al.

(10) Patent No.: US 12,154,482 B2
(45) Date of Patent: Nov. 26, 2024

(54) PIXEL CIRCUIT AND DISPLAY PANEL

(71) Applicant: Wuhan China Star Optoelectronics Semiconductor Display Technology Co., Ltd., Hubei (CN)

(72) Inventors: Liang Sun, Hubei (CN); Mian Zeng, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/432,948

(22) PCT Filed: Jun. 7, 2021

(86) PCT No.: PCT/CN2021/098536
§ 371 (c)(1),
(2) Date: Aug. 23, 2021

(87) PCT Pub. No.: WO2022/227231
PCT Pub. Date: Nov. 3, 2022

(65) Prior Publication Data
US 2024/0127738 A1 Apr. 18, 2024

(30) Foreign Application Priority Data
Apr. 27, 2021 (CN) ......................... 202110461626.2

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0408* (2013.01); *G09G 2300/0819* (2013.01); *G09G 2300/0852* (2013.01); *G09G 2300/0861* (2013.01); *G09G 2310/0262* (2013.01); *G09G 2310/08* (2013.01); *G09G 2320/0233* (2013.01); *G09G 2320/0247* (2013.01); *G09G 2320/0626* (2013.01)

(58) Field of Classification Search
CPC ..... G09G 3/32–3291; G09G 2300/0842–0866
See application file for complete search history.

(56) References Cited

U.S. PATENT DOCUMENTS 9,576,535 B2 * 2/2017 Park ..................... G09G 3/3241
11,189,228 B2 * 11/2021 Li ........................ G09G 3/3233
(Continued)

FOREIGN PATENT DOCUMENTS

CN 103165080 6/2013
CN 103198793 7/2013
(Continued)

*Primary Examiner* — Patrick F Marinelli

(57) ABSTRACT

The present application discloses a pixel circuit and a display panel. The pixel circuit includes a writing module, a transfer module, a first time-division transmission module, a drive module, a second time-division transmission module and a storing module. The storing module and the transfer module can be simultaneously charged with electricity through a data signal, and the storing module can be recharged by the transfer module in a light-emitting phase through the first time-division transmission module, the drive module and the second time-division transmission module.

18 Claims, 11 Drawing Sheets

(56) References Cited

U.S. PATENT DOCUMENTS

| | | | | |
|---|---|---|---|---|
| 11,538,402 | B2 * | 12/2022 | Yuan | G09G 3/3233 |
| 11,741,892 | B2 * | 8/2023 | Yang | G09G 3/3208 345/214 |
| 11,804,171 | B2 * | 10/2023 | Park | G09G 3/32 |
| 11,854,480 | B2 * | 12/2023 | Yu | G09G 3/3233 |
| 11,875,747 | B2 * | 1/2024 | Huangfu | G09G 3/3258 |
| 2005/0140605 | A1 * | 6/2005 | Jung | G09G 3/3233 345/76 |
| 2013/0063413 | A1 * | 3/2013 | Miyake | G09G 3/32 345/212 |
| 2014/0198085 | A1 * | 7/2014 | Park | G09G 3/3241 345/212 |
| 2014/0313106 | A1 * | 10/2014 | In | G09G 3/3233 345/76 |
| 2014/0320544 | A1 | 10/2014 | Kim | |
| 2021/0065624 | A1 * | 3/2021 | Li | G09G 3/3291 |
| 2022/0130322 | A1 * | 4/2022 | Yuan | G09G 3/32 |
| 2022/0180813 | A1 * | 6/2022 | Yang | G09G 3/3233 |
| 2022/0284862 | A1 * | 9/2022 | Dong | G09G 3/3266 |
| 2022/0366849 | A1 * | 11/2022 | Lee | H10K 59/124 |
| 2023/0010040 | A1 * | 1/2023 | Yu | G09G 3/3233 |
| 2023/0038319 | A1 * | 2/2023 | Kang | H10K 59/1213 |
| 2023/0059117 | A1 * | 2/2023 | Yang | G09G 3/3208 |
| 2023/0105490 | A1 * | 4/2023 | Park | G09G 3/3233 345/690 |
| 2023/0136237 | A1 * | 5/2023 | Wei | G09G 3/3266 345/204 |
| 2023/0154402 | A1 * | 5/2023 | Zheng | H10K 59/131 345/206 |
| 2023/0196986 | A1 * | 6/2023 | Yu | G09G 3/3233 345/55 |
| 2023/0290287 | A1 * | 9/2023 | Kim | G09G 3/3233 |
| 2023/0317004 | A1 * | 10/2023 | Choi | H10K 59/131 345/206 |
| 2023/0343294 | A1 * | 10/2023 | Guo | G09G 3/3266 |
| 2023/0351966 | A1 * | 11/2023 | Guo | G09G 3/3233 |
| 2023/0377510 | A1 * | 11/2023 | Yu | G09G 3/3233 |
| 2024/0021154 | A1 * | 1/2024 | Zeng | G09G 3/3233 |
| 2024/0021165 | A1 * | 1/2024 | Kang | G09G 3/3266 |

FOREIGN PATENT DOCUMENTS

| | | |
|---|---|---|
| CN | 103778889 | 5/2014 |
| CN | 104409043 | 3/2015 |
| CN | 108389549 | 8/2018 |
| CN | 110047431 | 7/2019 |
| CN | 110751927 | 2/2020 |
| CN | 111508422 | 8/2020 |
| CN | 112397026 | 2/2021 |
| CN | 112562588 | 3/2021 |
| KR | 10-2010-0072645 | 7/2010 |

* cited by examiner

PIXEL CIRCUIT AND DISPLAY PANEL

RELATED APPLICATIONS

This application is a National Phase of PCT Patent Application No. PCT/CN2021/098536 having International filing date of Jun. 7, 2021, which claims the benefit of priority of Chinese Patent Application No. 202110461626.2 filed on Apr. 27, 2021. The contents of the above applications are all incorporated by reference as if fully set forth herein in their entirety.

FIELD AND BACKGROUND OF THE INVENTION

The present application relates to display technologies, and more particularly to a pixel circuit and a display panel.

In traditional technical schemes, a gate of a drive transistor in a pixel circuit generally has a current leakage problem. As such, the potential of the gate of the drive transistor is not easy to be kept. For example, operations of a 7T1C pixel circuit shown in FIG. 1 can be divided into three primary phases as shown in FIG. 2.

First phase S1: a (N−1)-th-stage scan signal SCAN (N−1) is set to be low level, a transistor T4 is switched on, and the potential of the gate of the drive transistor T1 is reset to be the potential of a start signal VI.

Second phase S2: a N-th-stage scan signal SCAN (N) is set to be low level, a transistor T2 and a transistor T3 are switched on, the potential of the gate of the drive transistor T1 is charged VDATA-Vth by a data signal DATA sequentially via the transistor T2, the transistor T1 and the transistor T3, where VDATA is the potential of the data signal DATA, and Vth is the threshold voltage of the drive transistors T1. Meanwhile, a transistor T7 is switched on, and anode of a light-emitting device LED is reset to be the potential of the start signal VI.

Third phase S3: a light-emitting control signal EM(N) is set to be low level, and the light-emitting device LED starts to emit light.

In the second phase S2, the transistors T1 to T3 are switched on, and the transistors T4 to T6 are switched off. At this time, the potential of the gate of the drive transistors T1 is charged by the data signal DATA through a path formed by the transistors T1 to T3. When the potential of the gate of the drive transistor T1 rises to VDATA-Vth, the drive transistor T1 is turned off and the potential of the gate of the drive transistor T1 does not rise any more.

In the third phase S3, the luminance of a pixel is directly determined by the potential of the gate of the drive transistor T1. In the light-emitting phase T, the most important factor that affects the potential of the gate of the drive transistor T1 is current leakage, which will directly affect the luminance stability in the light-emitting phase T. As shown in FIG. 3, as time goes by, this will cause a decrease on the brightness of a screen, and there will be brightness difference ΔL1 in the light-emitting phase T for one frame. When the brightness difference ΔL1 reaches a certain value, flickers can be perceived by human eyes.

It should be noted that the afore-described background art is only for easy of clearly and completely understanding the solutions of the present application. The solutions described above are not therefore considered to be known to a person of ordinary skill in the art, merely because they appear in the background section of the present application.

SUMMARY OF THE INVENTION

The present application provides a pixel circuit and a display panel, which alleviate the technical problem that the potential of the control end of the drive module in the pixel circuit is not easy to be kept.

In a first aspect, the present application provides a pixel circuit, which includes a first power line, a second power line, a light-emitting device, a drive transistor, a writing transistor, a transfer capacitor and a first switch transistor; the light-emitting device and the drive transistor are connected in series between the first power line and the second power line; the storage capacitor is electrically connected to a gate of the drive transistor; one of a source and a drain of the writing transistor is electrically connected to the storage capacitor and the other one of the source and the drain of the writing transistor is used to receive a data signal; the transfer capacitor is electrically connected to the one of the source and the drain of the writing transistor; one of the source and the drain of the first switch transistor is electrically connected to the transfer capacitor and the one of the source and the drain of the writing transistor and the other one of the source and the drain of the first switch transistor is electrically connected to one of the source and the drain of the drive transistor.

In some embodiments, the pixel circuit further includes a second switch transistor; one of the source and the drain of the second switch transistor is electrically connected to the other one of the source and the drain of the drive transistor; the other one of the source and the drain of the second switch transistor is electrically connected to the storage capacitor and the gate of the drive transistor.

In some embodiments, the gate of the writing transistor is configured to receive a first control signal; the gate of the first switch transistor is configured to receive a second control signal; the gate of the second switch transistor is configured to receive the second control signal; in a same frame, a number of effective pulses of the first control signal is less than a number of effective pulses of the second control signal, and at least one effective pulse in the second control signal is as the same as an effective pulse of the first control signal.

In some embodiments, the pixel circuit further includes a third switch transistor; one of the source and the drain of the third switch transistor is electrically connected to the one of the source and the drain of the first switch transistor; the other one of the source and the drain of the third switch transistor is electrically connected to the other one of the source and the drain of the first switch transistor.

In some embodiments, the pixel circuit further includes a fourth switch transistor; one of the source and the drain of the fourth switch transistor is electrically connected to the one of the source and the drain of the second switch transistor; the other one of the source and the drain of the fourth switch transistor is electrically connected to the other one of the source and the drain of the second switch transistor.

In some embodiments, operation phases of the pixel circuit include a writing phase and a light-emitting phase; the gate of the writing transistor is configured to receive a first control signal; the gate of the first switch transistor is configured to receive the first control signal; the gate of the second switch transistor is configured to receive the first control signal; the gate of the third switch transistor is configured to receive a third control signal; the gate of the fourth switch transistor is configured to receive the third control signal; in a same frame, an effective pulse of the first control signal is in the writing phase and the effective pulse of the third control signal is in the light-emitting phase.

In some embodiments, the pixel circuit further includes a first light-emitting control transistor; one of the source and the drain of the first light-emitting control transistor is electrically connected to the one of the source and the drain of the drive transistor and the other one of the source and the drain of the first switch transistor; the gate of the first light-emitting control transistor is configured to receive a light-emitting control signal.

In some embodiments, the pixel circuit further includes a second light-emitting control transistor; one of the source and the drain of the second light-emitting control transistor is electrically connected to the other one of the source and the drain of the drive transistor and the one of the source and the drain of the second switch transistor; the gate of the second light-emitting control transistor is configured to receive the light-emitting control signal.

In a second aspect, the present application provides a pixel circuit, which includes a writing module, a transfer module, a first time-division transmission module, a drive module, a second time-division transmission module and a storing module; the writing module is configured to receive a data signal; the transfer module is connected to the writing module and is configured to store the data signal for outputting a compensation signal in a light-emitting phase of the pixel circuit; the first time-division transmission module is connected to the writing module and the transfer module and is configured to transmit the data signal and the compensation signal by way of time division; an input end of the drive module is connected to an output end of the first time-division transmission module; an input end of the second time-division transmission module is connected to an output end of the drive module, and the second time-division transmission module is configured to transmit the data signal and the compensation signal by way of time division; the storing module is connected to a control end of the drive module and an output end of the second time-division transmission module and is configured to store the data signal and the compensation signal in a same frame by way of time division for keeping a potential of the control end of the drive module in the light-emitting phase.

In some embodiments, the pixel circuit further includes a light-emitting control module, connected to the drive module, configured to control a light-emitting circuit loop of the pixel circuit to be turned on and off based on a light-emitting control signal; in the light-emitting state, the light-emitting control signal controls the light-emitting control module to be in an off state and the pixel circuit controls the compensation signal to be written to the storing module.

In some embodiments, the writing module includes a writing transistor; one of a source and a drain of the writing transistor is configured to receive the data signal; the other one of the source and the drain of the writing transistor is connected to the transfer module and the first time-division transmission module; a gate of the writing transistor is configured to receive a first control signal.

In some embodiments, the transfer module includes a transfer capacitor; a first end of the transfer capacitor is connected to the other one of the source and the drain of the writing transistor; a second end of the transfer capacitor is configured to receive a first power-supply signal.

In some embodiments, the first time-division transmission module includes a first time-division transmission transistor; one of the source and the drain of the first time-division transmission transistor is connected to the first end of the transfer capacitor; the other one of the source and the drain of the first time-division transmission transistor is connected to the drive module; the gate of the first time-division transmission transistor is configured to receive a second control signal; in a same frame, a number of effective pulses of the first control signal is less than a number of effective pulses of the second control signal, and at least one effective pulse in the second control signal is as the same as an effective pulse of the first control signal.

In some embodiments, the drive module includes a drive transistor; one of the source and the drain of the drive transistor is connected to the other one of the source and the drain of the first time-division transmission transistor; the other one of the source and the drain of the drive transistor is connected to an input end of the second time-division transmission module.

In some embodiments, the second time-division transmission module includes a second time-division transmission transistor; one of the source and the drain of the second time-division transmission transistor is connected to the other one of the source and the drain of the drive transistor; the other one of the source and the drain of the second time-division transmission transistor is connected to the gate of the drive transistor; the gate of the second time-division transmission transistor is configured to receive the second control signal.

In some embodiments, the storing module includes a storage capacitor; a first end of the storage capacitor is connected to the gate of the drive transistor; a second end of the storage capacitor is connected to the second end of the transfer capacitor.

In some embodiments, the light-emitting control module includes a first light-emitting control transistor and a second light-emitting control transistor; one of the source and the drain of the first light-emitting control transistor is connected to the second end of the storage capacitor; the other one of the source and the drain of the first light-emitting control transistor is connected to the one of the source and the drain of the drive transistor; the gate of the first light-emitting control transistor is configured to receive the light-emitting control signal; one of the source and the drain of the second light-emitting control transistor is connected to the other one of the source and the drain of the drive transistor; the gate of the second light-emitting control transistor is configured to receive the light-emitting control signal.

In some embodiments, the first time-division transmission module includes a first transistor and a second transistor; one of the source and the drain of the first transistor is connected to one of the source and the drain of the second transistor and the first end of the transfer capacitor; the other one of the source and the drain of the first transistor is connected to the other one of the source and the drain of the second transistor and an input end of the drive module; the gate of the first transistor is configured to receive the first control signal; the gate of the second transistor is configured to receive a third control signal; in a same frame, an effective pulse of the first control signal is in a writing phase and the effective pulse of the third control signal is in the light-emitting phase.

In some embodiments, the second time-division transmission module includes a third transistor and a fourth transistor; one of the source and the drain of the third transistor is connected to one of the source and the drain of the fourth transistor and an output end of the drive module; the other one of the source and the drain of the third transistor is connected to the other one of the source and the drain of the fourth transistor and the control end of the drive module; the gate of the third transistor is configured to receive the first control signal; the gate of the fourth transistor is configured to receive the third control signal.

In a third aspect, the present application provides a display panel, which includes the pixel driving circuit according to any of above implementations.

In the pixel circuit and the display panel provided in the present application, the storing module and the transfer module can be simultaneously charged with electricity through the data signal, and the storing module can be recharged by the transfer module in the light-emitting phase through the first time-division transmission module, the drive module and the second time-division transmission module. It is beneficial for keeping the potential of the control end of the drive module.

DESCRIPTION OF SPECIFIC EMBODIMENTS OF THE INVENTION

To make the objectives, technical schemes, and effects of the present application more clear and specific, the present application is described in further detail below with reference to the embodiments in accompanying with the appending drawings. It should be understood that the specific embodiments described herein are merely for interpreting the present application and the present application is not limited thereto.

Figure 1:
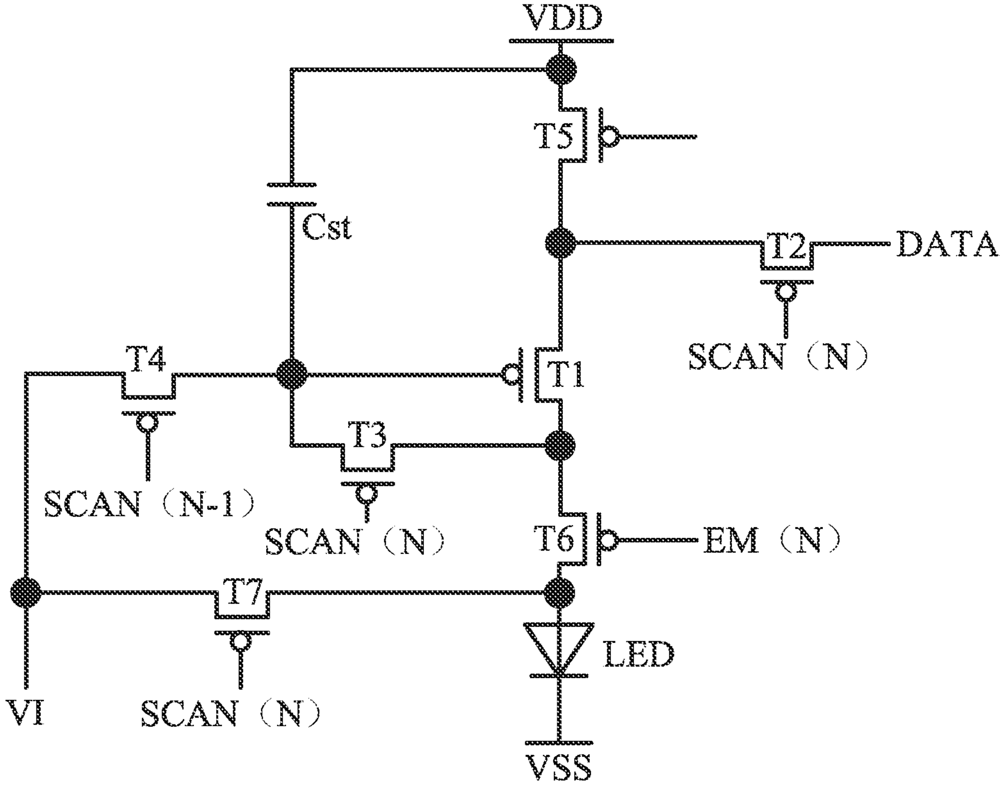
FIG. 1 is a schematic diagram illustrating the structure of a pixel circuit in traditional solutions.
Figure 2:
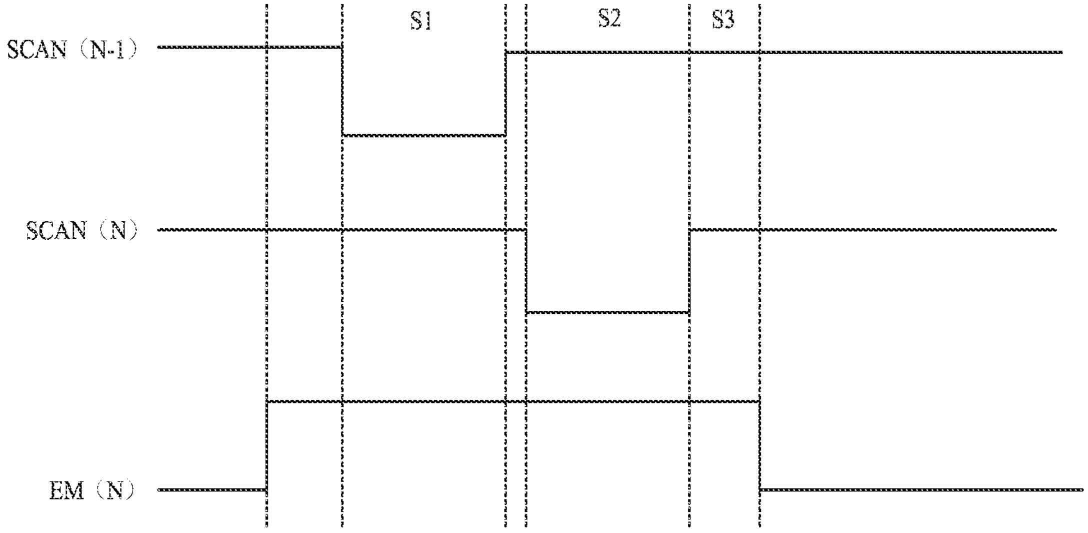
FIG. 2 is a timing diagram of the pixel circuit in FIG. 1.
Figure 3:
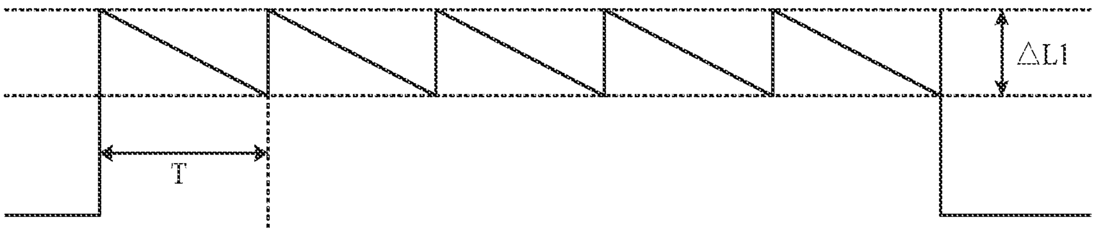
FIG. 3 is a diagram showing brightness difference in a light-emitting phase for one frame made by the pixel circuit in FIG. 1.
Figure 4:
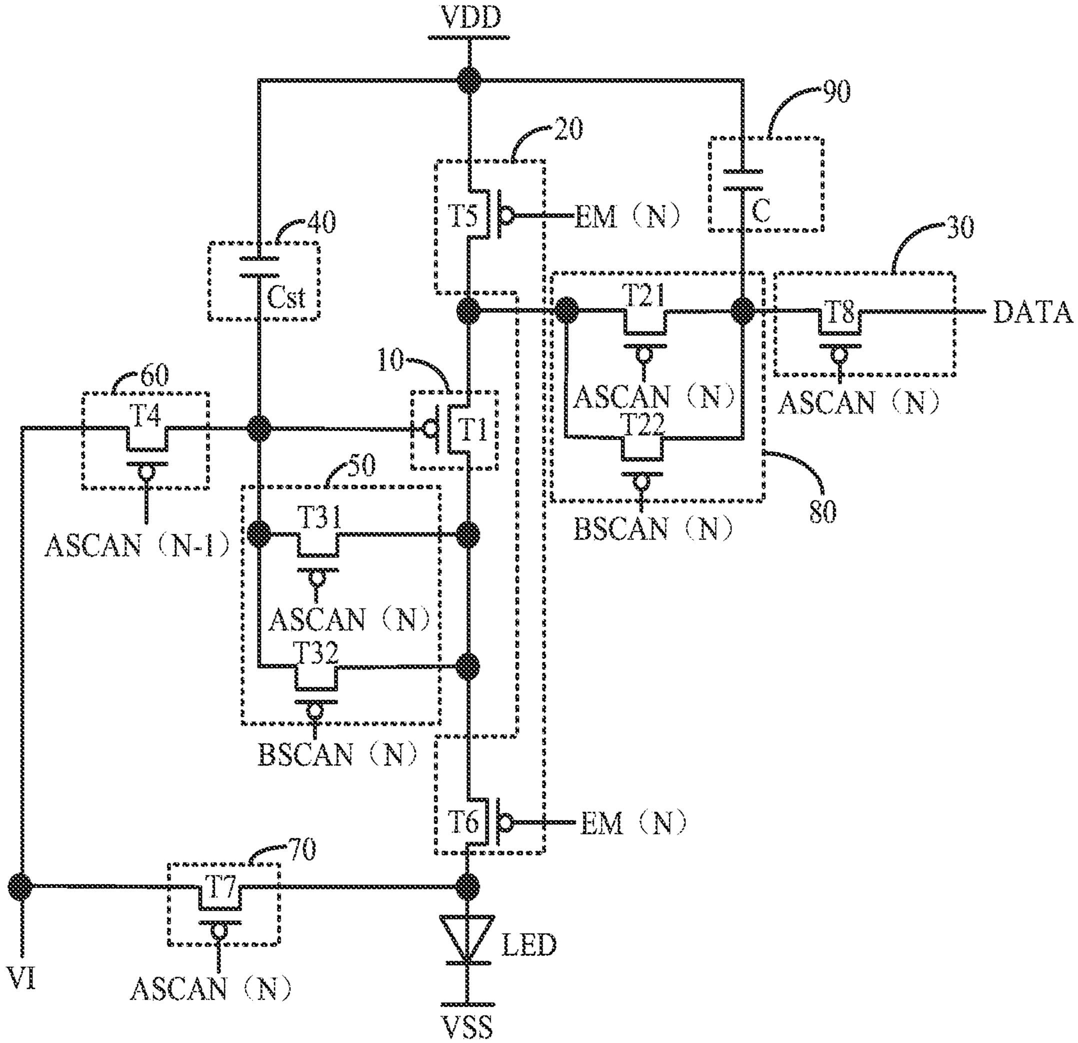
FIG. 4 is a schematic diagram illustrating the structure of a pixel circuit provided in an embodiment of the present application.

Please refer to FIGS. 4 to 16. As shown in FIG. 4 and/or FIG. 8, the present embodiment provides a pixel circuit, which includes a writing module 30, a transfer module 90, a first time-division transmission module 80, a drive module 10, a second time-division transmission module 50 and a storing module 40. The writing module 30 is configured to receive a data signal DATA. The transfer module 90 is connected to the writing module 30 and is configured to store the data signal DATA for outputting a compensation signal in a light-emitting phase of the pixel circuit. The first time-division transmission module 80 is connected to the writing module 30 and the transfer module 90 and is configured to transmit the data signal DATA and the compensation signal by way of time division. An input end of the drive module 10 is connected to an output end of the first time-division transmission module 80. The input end of the second time-division transmission module 50 is connected to the output end of the drive module 10. The second time-division transmission module 50 is configured to transmit the data signal DATA and the compensation signal by way of time division. The storing module 40 is connected to a control end of the drive module 10 and the output end of the second time-division transmission module 50 and is configured to store the data signal DATA and the compensation signal in a same frame by way of time division for keeping the potential of the control end of the drive module 10 in the light-emitting phase.

It can be understood that in the pixel circuit provided in the present embodiment, the storing module 40 and the transfer module 90 can be simultaneously charged with electricity through the data signal DATA, and the storing module 40 can be recharged by the transfer module 90 in the light-emitting phase through the first time-division transmission module 80, the drive module 10 and the second time-division transmission module 50. It is beneficial for keeping the potential of the control end of the drive module 10.

In one embodiment, the pixel circuit further includes a light-emitting control module 20; the light-emitting control module 20 is connected to the drive module 10 and is configured to control a light-emitting circuit loop of the pixel circuit to be turned on and off based on a light-emitting control signal EM(N); in the light-emitting state, the light-emitting control signal EM(N) controls the light-emitting control module 20 to be in an off state and the pixel circuit controls the compensation signal to be written to the storing module 40.

In one embodiment, the light-emitting control module 20 includes a first light-emitting control transistor T5 and a second light-emitting control transistor T6; one of the source and the drain of the first light-emitting control transistor T5 is connected to the second end of the storage capacitor Cst; the other one of the source and the drain of the first light-emitting control transistor T5 is connected to the one of the source and the drain of the drive transistor T1; the gate of the first light-emitting control transistor T5 is configured to receive the light-emitting control signal EM(N); one of the source and the drain of the second light-emitting control transistor T6 is connected to the other one of the source and the drain of the drive transistor T1; the gate of the second light-emitting control transistor T6 is configured to receive the light-emitting control signal EM(N).

In one embodiment, the writing module 30 includes a writing transistor T8; one of a source and a drain of the writing transistor T8 is configured to receive the data signal DATA; the other one of the source and the drain of the writing transistor T8 is connected to the transfer module 90 and the first time-division transmission module 80; a gate of the writing transistor T8 is configured to receive a first control signal.

The first control signal may be, but is not limited to, a N-th-stage scan signal ASCAN(N) of group A.

In one embodiment, the transfer module 90 includes a transfer capacitor C; a first end of the transfer capacitor C is connected to the other one of the source and the drain of the writing transistor T8; a second end of the transfer capacitor C is configured to receive a first power-supply signal VDD.

In one embodiment, the drive module 10 includes a drive transistor T1; one of the source and the drain of the drive transistor T1 is connected to the other one of the source and the drain of the first time-division transmission transistor T2; the other one of the source and the drain of the drive transistor T1 is connected to an input end of the second time-division transmission module 50.

In one embodiment, the storing module 40 includes a storage capacitor Cst; a first end of the storage capacitor Cst is connected to the gate of the drive transistor T1; a second end of the storage capacitor Cst is connected to the second end of the transfer capacitor C.

As shown in FIG. 4, in one embodiment, the first time-division transmission module 80 includes a first transistor T21 and a second transistor T22; one of the source and the drain of the first transistor T21 is connected to one of the source and the drain of the second transistor T22 and the first end of the transfer capacitor C; the other one of the source and the drain of the first transistor T21 is connected to the other one of the source and the drain of the second transistor T22 and an input end of the drive module 10; the gate of the first transistor T21 is configured to receive the first control signal; the gate of the second transistor T22 is configured to receive a third control signal; in a same frame, an effective pulse of the first control signal is in a writing phase and the effective pulse of the third control signal is in the light-emitting phase.

The third control signal may be, but is not limited to, a N-th-stage scan signal BSCAN(N) of group B.

In one embodiment, the second time-division transmission module 50 includes a third transistor T31 and a fourth transistor T32; one of the source and the drain of the third transistor T31 is connected to one of the source and the drain of the fourth transistor T32 and an output end of the drive module 10; the other one of the source and the drain of the third transistor T31 is connected to the other one of the source and the drain of the fourth transistor T32 and the control end of the drive module 10; the gate of the third transistor T31 is configured to receive the first control signal; the gate of the fourth transistor T32 is configured to receive the third control signal.

In one embodiment, the pixel circuit may further include a first reset module 60; an input end of the first reset module 60 is configured to receive a reset signal VI; an output end of the first reset module 60 is connected to the control end of the drive module 10; a control end of the first reset module 60 is configured to receive a fourth control signal.

The fourth control signal may be, but is not limited to, a (N−1)-th-stage scan signal ASCAN(N−1) of group A. The first reset module 60 includes a first reset transistor T4; one of the source and the drain of the first reset transistors T4 is configured to receive the reset signal VI; the other one of the source and the drain of the first reset transistor T4 is connected to the gate of the drive transistor T1; the gate of the first reset transistor T4 is configured to receive the fourth control signal.

In one embodiment, the pixel circuit may further include a second reset module 70; an input end of the second reset module 70 is configured to receive the reset signal VI; an output end of the second reset module 70 is connected to an anode of a light-emitting device LED; a control end of the second reset module 70 is configured to receive the first control signal.

The second reset module 70 includes a second reset transistor T7; one of the source and the drain of the second reset transistor T7 is configured to receive the reset signal VI; the other one of the source and the drain of the second reset transistor T7 is connected to the anode of the light-emitting device LED; the gate of the second reset transistor T7 is configured to receive the first control signal.

In one embodiment, the pixel circuit may further include the light-emitting device LED; the anode of the light-emitting device LED is connected to the other one of the source and the drain of the second light-emitting control transistor T6; a cathode of the light-emitting device LED is configured to receive a second power-supply signal VSS.

The potential of the first power-supply signal VDD is higher than the potential of the second power-supply signal VSS. The light-emitting device LED may be, but is not limited to, an organic light-emitting device (OLED), or a Mini-LED, or a Micro-LED.

In one embodiment, the transistors in foregoing embodiment may be, but are not limited to, P-type thin-film transistors or N-type thin-film transistors.

In one embodiment, the transistors in foregoing embodiment may be, but are not limited to, polysilicon thin-film transistors or low-temperature polysilicon thin-film transistors.

At least one of the first reset transistor T4, the third transistor T31, the fourth transistor T32 or the first time-division transmission transistor T2 may further be an oxide transistor and may also be a metal-oxide transistor. In this way, current leakage of the gate of the drive transistor T1 can be lowered in a further step.

Figure 5:
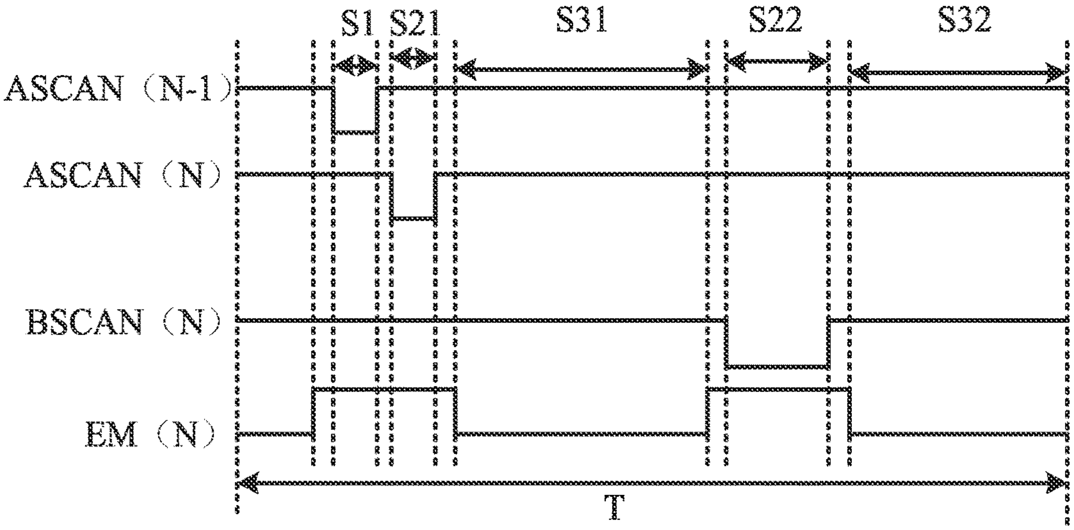
FIG. 5 is a timing diagram of the pixel circuit in FIG. 4.
Figure 6:
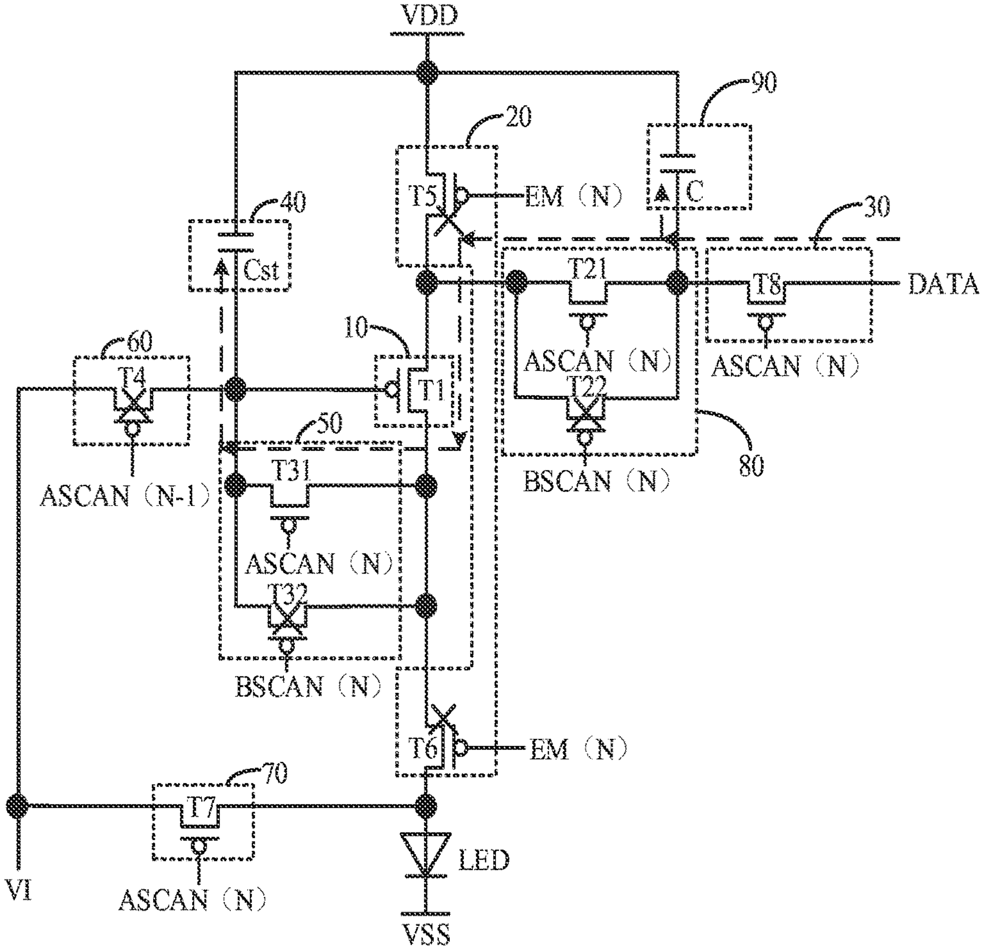
FIG. 6 is a schematic diagram illustrating a writing phase of the pixel circuit in FIG. 4.
Figure 7:
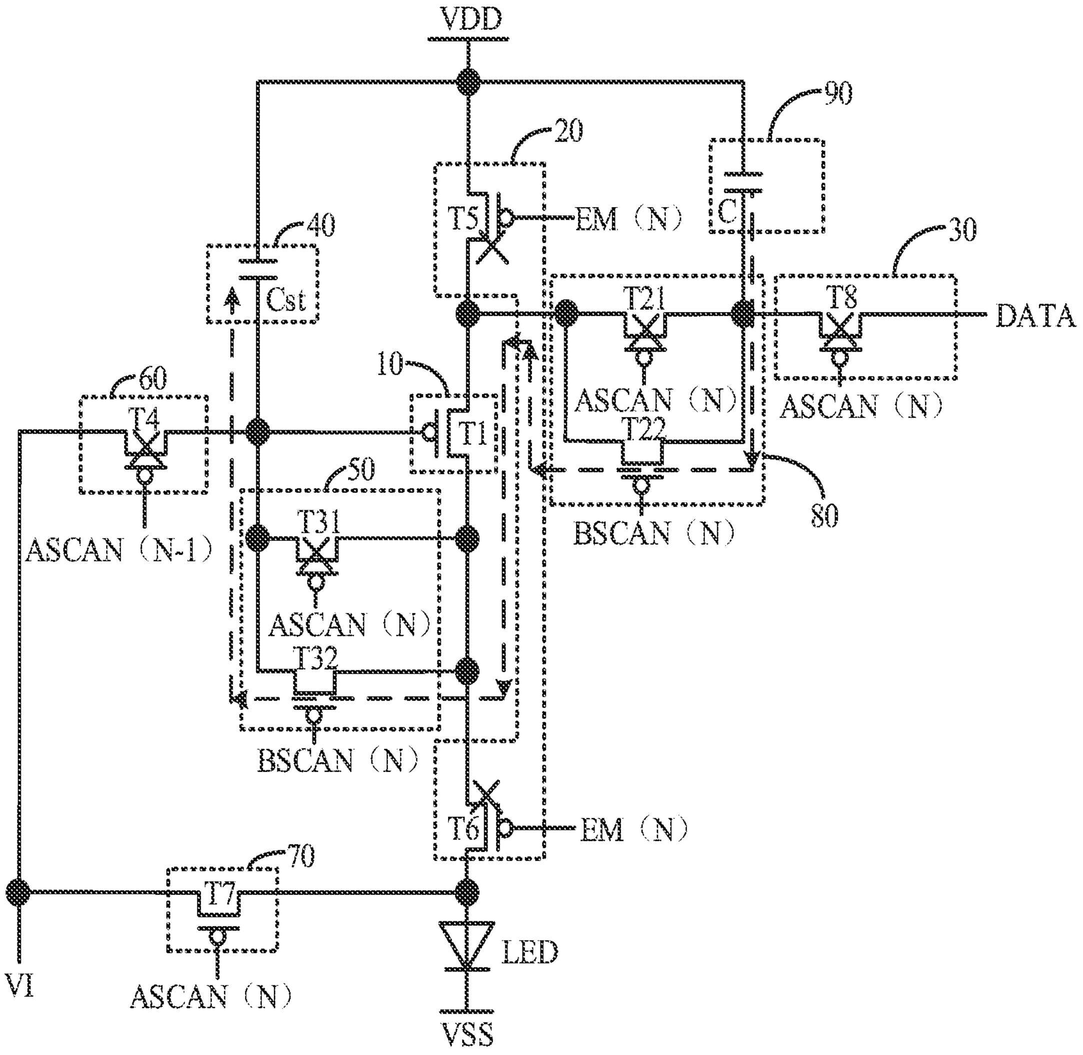
FIG. 7 is a schematic diagram illustrating a transfer phase of the pixel circuit in FIG. 4.

As shown in FIGS. 5 to 7, in one embodiment, operation phases of the afore-described pixel circuit in the period T of one frame may include the followings.

First phase S1 (i.e., a reset phase): the (N−1)-th-stage scan signal of group A is set to be low level, the first reset transistor T4 is switched on, and the potential of the gate of the drive transistor T1 is reset to be the potential of the reset signal VI.

Second phase S21 (i.e., a writing phase): as shown in FIG. 6, the N-th-stage scan signal of group A is set to be low level, the transfer capacitor C is charged by the data signal DATA via the writing transistor T8; meanwhile, the storage capacitor Cst is charged by the data signal DATA sequentially via the first transistor T21, the drive transistor T1 and the third transistor T31. The paths, formed by simultaneously charging the transfer capacitor C and the storage capacitor Cst by the data signal DATA, are indicated by dotted lines with arrows as shown in FIG. 6. In the second phase S21, all the first reset transistor T4, the first light-emitting control transistor T5 and the second light-emitting control transistor T6 are in an off state. As shown in FIG. 6, the cross sign X can represent a corresponding thin-film transistor in the off state.

Third phase S31 (i.e., a first light-emitting phase): it needs to be noted that operation phases of the afore-described pixel circuit may include a light-emitting phase for each frame, and each light-emitting phase may include a first light-emitting phase, a transfer phase and a second light-emitting phase. The light-emitting control signal EM(N) is set to be low level, the first light-emitting control transistor T5 and the second light-emitting control transistor T6 are switched on, and the light-emitting device LED emits light.

Fourth phase S22 (i.e., a transfer phase): it can be understood that the fourth phase S22 belongs to a part of the light-emitting phase and is located between the start and the end of the light-emitting phase. The light-emitting control signal EM(N) is set to be high level, and the N-th-stage scan signal of group B is set to be low level. As shown in FIG. 7, the storage capacitor Cst is recharged by electrical signals in the transfer capacitor C sequentially via the second transistor T22, the drive transistor T1 and the fourth transistor T32. The path, formed by transferring the electrical signals from the transfer capacitor C to the storage capacitor Cst, is indicated by a dotted line with an arrow as shown in FIG. 7. Meanwhile, in the fourth phase S22, all the writing transistor T8, the first reset transistor T4, the first light-emitting control transistor T5 and the second light-emitting control transistor T6 are in an off state. As shown in FIG. 7, the cross sign X can represent a corresponding thin-film transistor in the off state.

Fifth phase S32 (i.e., a second light-emitting phase): the light-emitting control signal EM(N) is set to be low level, the first light-emitting control transistor T5 and the second light-emitting control transistor T6 are switched on, and the light-emitting device LED emits light.

Figure 8:
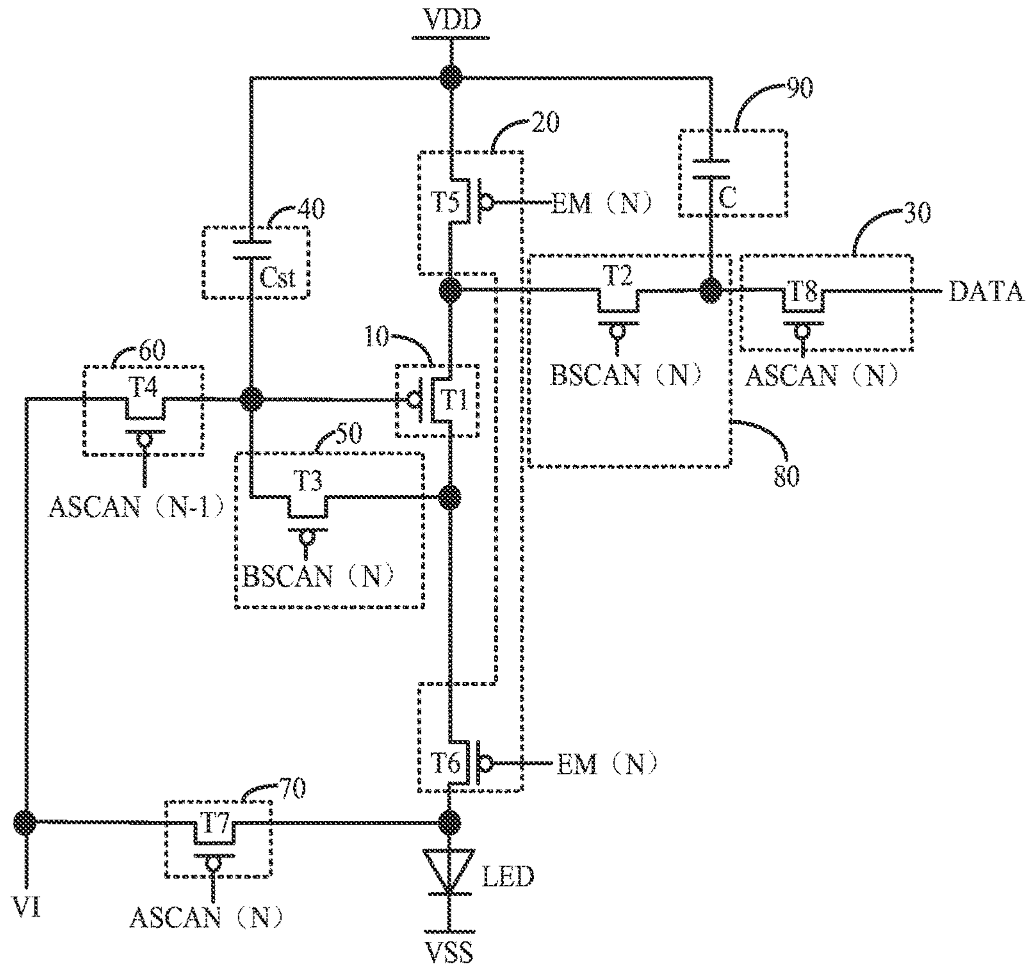
FIG. 8 is a schematic diagram illustrating the structure of another pixel circuit provided in an embodiment of the present application.

As shown in FIG. 8, in one embodiment, the first time-division transmission module 80 includes a first time-division transmission transistor T2; one of the source and the drain of the first time-division transmission transistor T2 is connected to the first end of the transfer capacitor C; the other one of the source and the drain of the first time-division transmission transistor T2 is connected to the drive module 10; the gate of the first time-division transmission transistor T2 is configured to receive a second control signal; in a same frame, a number of effective pulses of the first control signal is less than a number of effective pulses of the second control signal, and at least one effective pulse in the second control signal is as the same as an effective pulse of the first control signal.

It can be understood that both the effective pulse of the first control signal and the effective pulse of the second control signal can control a corresponding thin-film transistor to be switched on to form a transmission path. In the second phase S21, both the first control signal and the second control signal have the effective pulse, which can enable the data signal DATA to be written to the transfer capacitor C and the storage capacitor Cst simultaneously. In the fourth phase S22, the first control signal does not have the effective pulse such that the data signal DATA cannot be written to the transfer capacitor C and the storage capacitor Cst; however, the second control signal has the effective pulse and at this time the storage capacitor Cst can be recharged by the transfer capacitor C in a same frame.

In one embodiment, the second time-division transmission module 50 includes a second time-division transmission transistor T3; one of the source and the drain of the second time-division transmission transistor T3 is connected to the other one of the source and the drain of the drive transistor T1; the other one of the source and the drain of the second time-division transmission transistor T3 is connected to the gate of the drive transistor T1; the gate of the second time-division transmission transistor T3 is configured to receive the second control signal.

The second control signal may be, but is not limited to, another N-th-stage scan signal BSCAN(N) of group B and differ from the third control signal.

Figure 9:
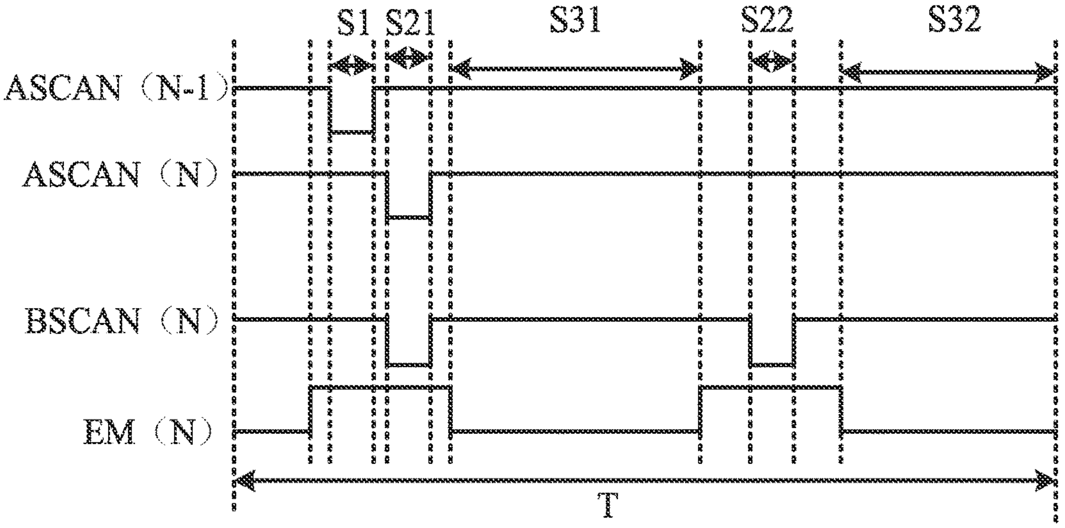
FIG. 9 is a timing diagram of the pixel circuit in FIG. 8.
Figure 10:
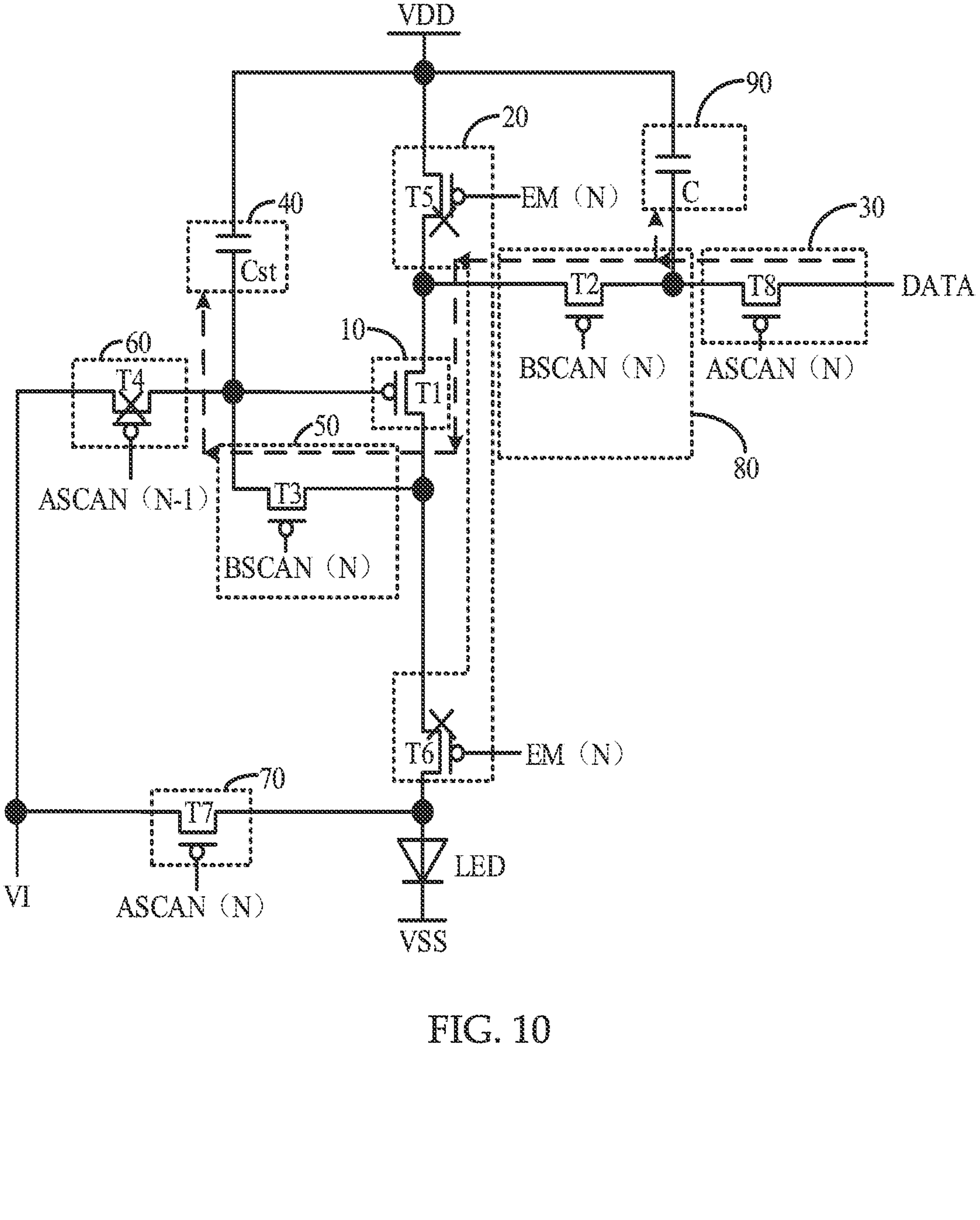
FIG. 10 is a schematic diagram illustrating a writing phase of the pixel circuit in FIG. 8.
Figure 11:
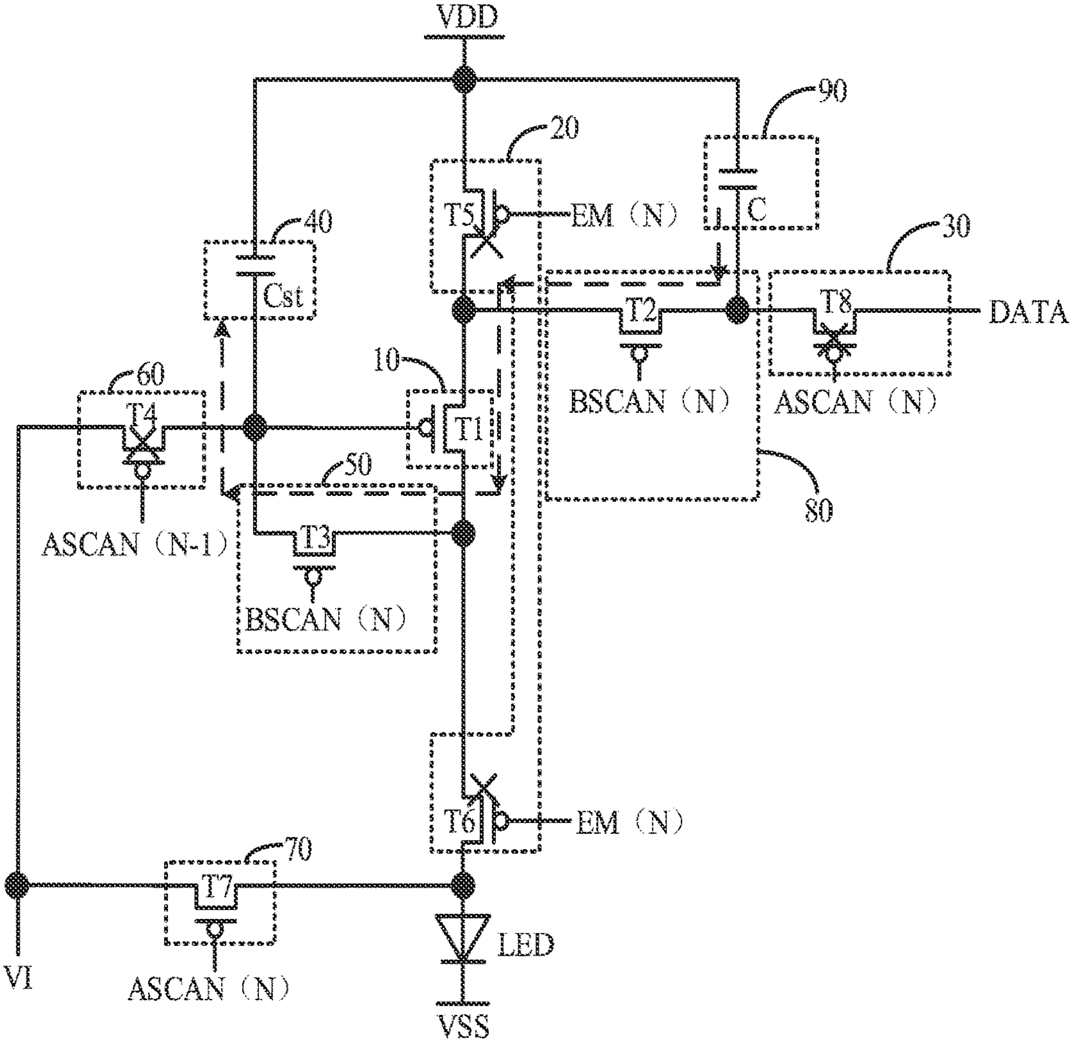
FIG. 11 is a schematic diagram illustrating a transfer phase of the pixel circuit in FIG. 8.

As shown in FIGS. 9 to 11, in one embodiment, operation phases of the afore-described pixel circuit in the period T of one frame may include the followings.

First phase S1 (i.e., a reset phase): the (N−1)-th-stage scan signal of group A is set to be low level, the first reset transistor T4 is switched on, and the potential of the gate of the drive transistor T1 is reset to be the potential of the reset signal VI.

Second phase S21 (i.e., a writing phase): as shown in FIG. 10, both the N-th-stage scan signal of group A and the N-th-stage scan signal of group B are set to be low level, the transfer capacitor C is charged by the data signal DATA via the writing transistor T8; meanwhile, the storage capacitor Cst is charged by the data signal DATA sequentially via the first time-division transmission transistor T2, the drive transistor T1 and the second time-division transmission transistor T3. The paths, formed by simultaneously charging the transfer capacitor C and the storage capacitor Cst by the data signal DATA, are indicated by dotted lines with arrows as shown in FIG. 10. In the second phase S21, all the first reset transistor T4, the first light-emitting control transistor T5 and the second light-emitting control transistor T6 are in an off state. As shown in FIG. 10, the cross sign X can represent a corresponding thin-film transistor in the off state.

Third phase S31 (i.e., a first light-emitting phase): it needs to be noted that operation phases of the afore-described pixel circuit may include a light-emitting phase for each frame, and each light-emitting phase may include a first light-emitting phase, a transfer phase and a second light-emitting phase. The light-emitting control signal EM(N) is set to be low level, the first light-emitting control transistor T5 and the second light-emitting control transistor T6 are switched on, and the light-emitting device LED emits light.

Fourth phase S22 (i.e., a transfer phase): it can be understood that the fourth phase S22 belongs to a part of the light-emitting phase and is located between the start and the end of the light-emitting phase. The light-emitting control signal EM(N) is set to be high level, and the N-th-stage scan signal of group B is set to be low level. As shown in FIG. 11, the storage capacitor Cst is recharged by electrical signals in the transfer capacitor C sequentially via the first time-division transmission transistor T2, the drive transistor T1 and the second time-division transmission transistor T3. The path, formed by transferring the electrical signals from the transfer capacitor C to the storage capacitor Cst, is indicated by a dotted line with an arrow as shown in FIG. 11. Meanwhile, in the fourth phase S22, all the writing transistor T8, the first reset transistor T4, the first light-emitting control transistor T5 and the second light-emitting control transistor T6 are in an off state. As shown in FIG. 11, the cross sign X can represent a corresponding thin-film transistor in the off state.

Fifth phase S32 (i.e., a second light-emitting phase): the light-emitting control signal EM(N) is set to be low level, the first light-emitting control transistor T5 and the second light-emitting control transistor T6 are switched on, and the light-emitting device LED emits light.

Figure 12:
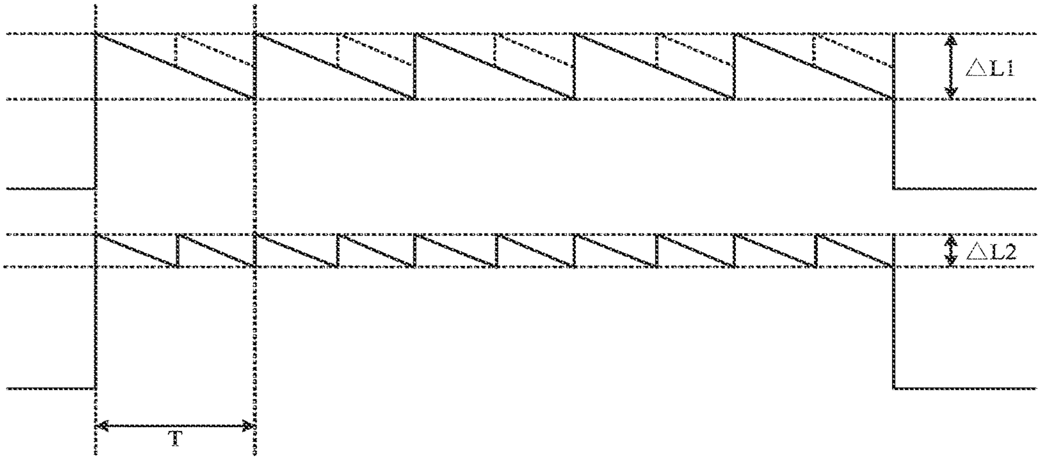
FIG. 12 is a schematic diagram showing a comparison of brightness difference for different pixel circuits.

As shown in FIG. 12, the brightness difference is ΔL1 in one frame period T for the pixel circuit in traditional solutions; the brightness difference is ΔL2 in one frame period T for the pixel circuit in the present embodiment. Since the storage capacitor Cst is recharged in one frame period T, current leakage of the gate of the drive transistor T1 can thus be compensated. Therefore, ΔL2 is obviously small than ΔL1.

Based on above analysis, the present embodiment provides a pixel circuit, which includes a first power line, a second power line, a light-emitting device LED, a drive transistor T1, a writing transistor T8, a transfer capacitor C and a first switch transistor; the light-emitting device LED is connected in series between the first power line and the second power line; the drive transistor T1 is connected in series between the first power line and the second power line; the storage capacitor Cst is electrically connected to a gate of the drive transistor T1; one of a source and a drain of the writing transistor T8 is electrically connected to the storage capacitor Cst and the other one of the source and the drain of the writing transistor T8 is used to receive a data signal DATA; the transfer capacitor C is electrically connected to the one of the source and the drain of the writing transistor T8; one of the source and the drain of the first switch transistor is electrically connected to the transfer capacitor C and the one of the source and the drain of the writing transistor T8 and the other one of the source and the drain of the first switch transistor is electrically connected to one of the source and the drain of the drive transistor T1.

It can be understood that in the present embodiment, the transfer capacitor C can be charged by the data signal DATA via the writing transistor T8, the data signal DATA is electrically connected to the storage capacitor Cst via the writing transistor T8, the first switch transistor and the drive transistor T1 such that the data signal DATA can also charge the storage capacitor Cst. Moreover, the transfer capacitor C can be electrically connected to the storage capacitor Cst via the first switch transistor and the drive transistor T1 such that the storage capacitor Cst can be recharged in a same frame. It is beneficial for keeping the potential of the gate of the drive transistor T1.

It needs to be noted that the first power line can be used to transmit one of a first power-supply signal VDD and a second power-supply signal VSS. The second power line can be used to transmit the other one of the first power-supply signal VDD and the second power-supply signal VSS. The first switch transistor may be, but is not limited to, the first time-division transmission transistor T2 or the first transistor T21, and may also be a thin-film transistor.

In one embodiment, the pixel circuit further includes a second switch transistor; one of the source and the drain of the second switch transistor is electrically connected to the other one of the source and the drain of the drive transistor T1; the other one of the source and the drain of the second switch transistor is electrically connected to the storage capacitor Cst and the gate of the drive transistor T1.

It needs to be noted that the second switch transistor may be, but is not limited to, the second time-division transmission transistor T3 or the third transistor T31, and may also be a thin-film transistor.

In one embodiment, the gate of the writing transistor T8 is configured to receive a first control signal; the gate of the first switch transistor is configured to receive a second control signal; the gate of the second switch transistor is configured to receive the second control signal; in a same frame, a number of effective pulses of the first control signal is less than a number of effective pulses of the second control signal, and at least one effective pulse in the second control signal is as the same as an effective pulse of the first control signal.

In one embodiment, the pixel circuit further includes a third switch transistor; one of the source and the drain of the third switch transistor is electrically connected to the one of the source and the drain of the first switch transistor; the other one of the source and the drain of the third switch transistor is electrically connected to the other one of the source and the drain of the first switch transistor.

It needs to be noted that the third switch transistor may be, but is not limited to, the second transistor T22, and may also be a thin-film transistor.

In one embodiment, the pixel circuit further includes a fourth switch transistor; one of the source and the drain of the fourth switch transistor is electrically connected to the one of the source and the drain of the second switch transistor; the other one of the source and the drain of the fourth switch transistor is electrically connected to the other one of the source and the drain of the second switch transistor.

It needs to be noted that the third switch transistor may be, but is not limited to, the fourth transistor T32, and may also be a thin-film transistor.

In one embodiment, the gate of the writing transistor T8 is configured to receive a first control signal; the gate of the first switch transistor is configured to receive the first control signal; the gate of the second switch transistor is configured to receive the first control signal; the gate of the third switch transistor is configured to receive a third control signal; the gate of the fourth switch transistor is configured to receive the third control signal; in a same frame, an effective pulse of the first control signal is in the writing phase and the effective pulse of the third control signal is in the light-emitting phase.

In one embodiment, the pixel circuit further includes a first light-emitting control transistor T5; one of the source and the drain of the first light-emitting control transistor T5 is electrically connected to the one of the source and the drain of the drive transistor T1 and the other one of the source and the drain of the first switch transistor; the gate of the first light-emitting control transistor T5 is configured to receive a light-emitting control signal EM(N).

In one embodiment, the pixel circuit further includes a second light-emitting control transistor T6; one of the source and the drain of the second light-emitting control transistor T6 is electrically connected to the other one of the source and the drain of the drive transistor T1 and the one of the source and the drain of the second switch transistor; the gate of the second light-emitting control transistor T6 is configured to receive the light-emitting control signal EM(N).

In one embodiment, the present application provides a pixel circuit driving method. Operation phases of the pixel circuit at least include a writing phase and a light-emitting phase; the pixel circuit includes a storing module 40 and a transfer module 90. The driving method includes providing a pixel circuit and a data signal DATA; in the writing signal, simultaneously writing, by the pixel circuit, the data signal DATA to the storing module 40 and the transfer module 90; and in the light-emitting phase, outputting, by the pixel circuit, electrical signals from the transfer module 90 to the storing module 40.

It can be understood that in the driving method provided in the present embodiment, the storing module 40 and the transfer module 90 can be simultaneously charged with electricity through the data signal DATA, and the storing module 40 can be recharged by the transfer module 90 in the light-emitting phase. It is beneficial for keeping the potential of the control end of the drive module 10.

In one embodiment, the present application provides a display panel including the pixel circuit according to any of the afore-described embodiments.

It can be understood that in the display panel provided in the present embodiment, the storing module 40 and the transfer module 90 can be simultaneously charged with electricity through the data signal DATA, and the storing module 40 can be recharged by the transfer module 90 in the light-emitting phase through the first time-division transmission module 80, the drive module 10 and the second time-division transmission module 50. It is beneficial for keeping the potential of the control end of the drive module 10.

In one embodiment, foregoing display panel may further include a first gate on array (GOA) circuit and a second GOA circuit. The first GOA circuit can be used to output scan signals of group A and the second GOA circuit can be used to output scan signals of group B.

Figure 13:
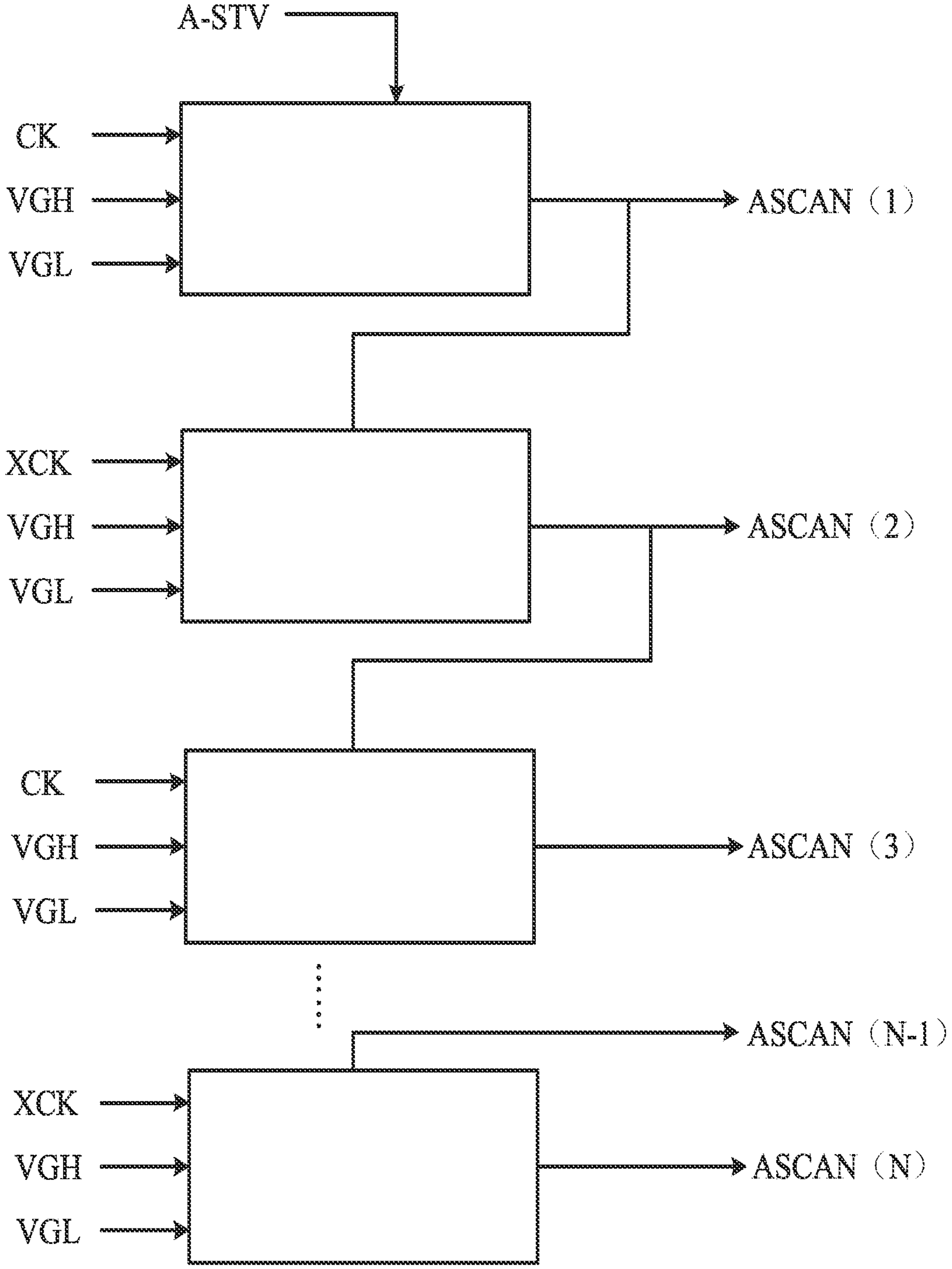
FIG. 13 is a schematic diagram showing the structure of a GOA circuit provided in an embodiment of the present application.

As shown in FIG. 13, the first GOA circuit may include a plurality of cascaded first GOA units. For example, a first-stage scan signal ASCAN (1) of group A outputted by a first-stage first GOA unit can serve as an input signal of a second-stage first GOA unit; a second-stage scan signal ASCAN (2) of group A outputted by the second-stage first GOA unit can serve as an input signal of a third-stage first GOA unit; a third-stage scan signal ASCAN (3) of group A outputted by the third-stage first GOA unit can serve as an input signal of a fourth-stage first GOA unit; a (N−1)-th-stage scan signal ASCAN (N−1) of group A outputted by a (N−1)-th-stage first GOA unit can serve as an input signal of a N-th-stage first GOA unit, and the N-th-stage first GOA unit outputs a N-th-stage scan signal ASCAN (N) of group A, correspondingly.

The first GOA units at odd stages receive a clock signal CK, and the first GOA units at even stages receive a clock signal XCK. The first-stage first GOA unit may receive a start signal A-STV of group A. Any stage of the first GOA units needs to receive a corresponding high level VGH and a corresponding low level VGL. The high level VGH can switch on a corresponding thin-film transistor, and the low level VGL can switch off a corresponding thin-film transistor. Alternatively, the high level VGH can switch off a corresponding thin-film transistor, and the low level VGL can switch on a corresponding thin-film transistor.

Figure 14:
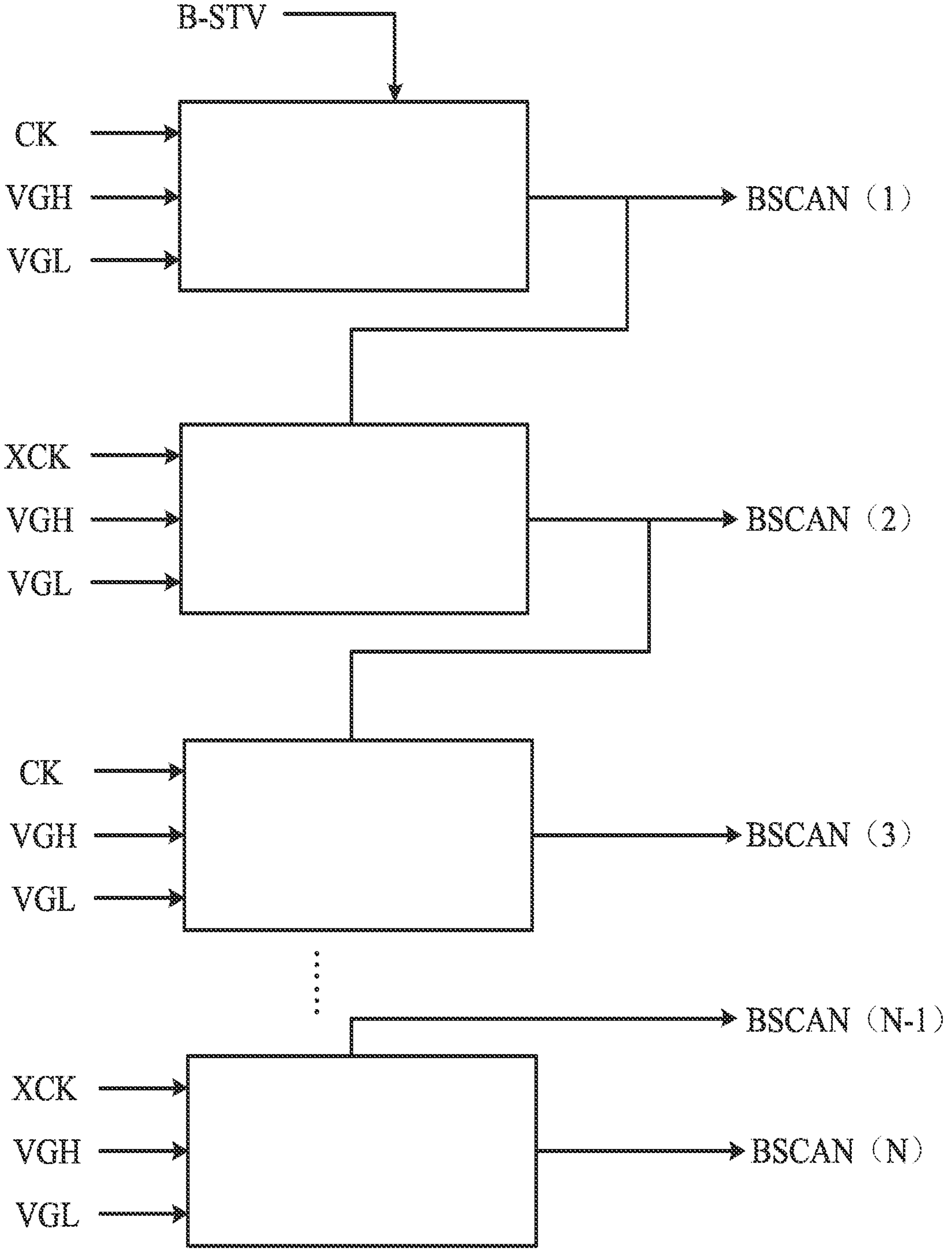
FIG. 14 is a schematic diagram showing the structure of another GOA circuit provided in an embodiment of the present application.

As shown in FIG. 14, the second GOA circuit may include a plurality of cascaded second GOA units. For example, a first-stage scan signal BSCAN (1) of group B outputted by a first-stage second GOA unit can serve as an input signal of a second-stage second GOA unit; a second-stage scan signal BSCAN (2) of group B outputted by the second-stage second GOA unit can serve as an input signal of a third-stage second GOA unit; a third-stage scan signal BSCAN (3) of group B outputted by the third-stage second GOA unit can serve as an input signal of a fourth-stage second GOA unit; a (N−1)-th-stage scan signal BSCAN (N−1) of group B outputted by a (N−1)-th-stage second GOA unit can serve as an input signal of a N-th-stage second GOA unit, and the N-th-stage second GOA unit outputs a N-th-stage scan signal BSCAN (N) of group B, correspondingly.

Any stage of the first GOA units or the second GOA units needs to receive a corresponding high level VGH and a corresponding low level VGL. The high level VGH can switch on a corresponding thin-film transistor, and the low level VGL can switch off a corresponding thin-film transistor. The second GOA units at odd stages receive a clock signal XCK, and the second GOA units at even stages receive a clock signal CK. The first-stage second GOA unit may receive a start signal B-STV of group B.

Figure 15:
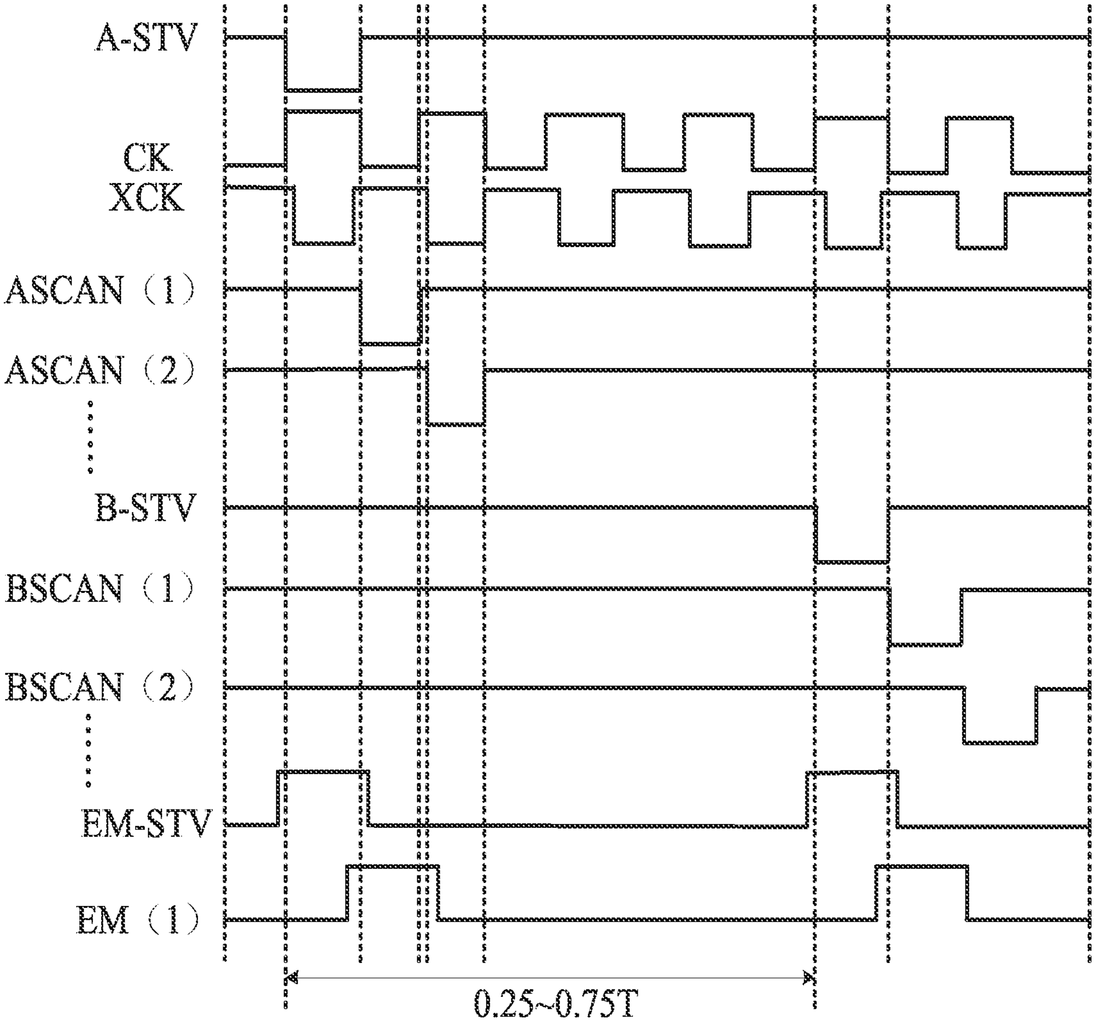
FIG. 15 is a timing diagram of a display panel provided in an embodiment of the present application.

In one embodiment, as shown in FIG. 15, the first GOA circuit can generate corresponding scan signals of group A under the control of the start signal A-STV of group A, the clock signal CK and the clock signal XCK. The second GOA circuit can generate corresponding scan signals of group B under the control of the start signal B-STV of group B, the clock signal CK and the clock signal XCK. A light-emission driving circuit can generate a corresponding light-emitting control signal, such as a first-stage light-emitting control signal EM(1), under the control of a light-emission start signal EM-STV, the clock signal CK and the clock signal XCK.

When the first-stage scan signal ASCAN (1) of group A is at low level, the first reset transistor T4 is switched on such that the potential of the gate of the drive transistor T1 is reset. When the second-stage scan signal ASCAN (2) of group A is at low level, the data signal DATA is simultaneously written to the transfer capacitor C and the storage capacitor Cst. The first-stage scan signal BSCAN (1) of group B is outputted by the first-stage second GOA unit. When the second-stage scan signal BSCAN (2) of group B is at low level, the storage capacitor Cst is recharged by the electrical signals in the transfer capacitor C.

Writing the data signal DATA may be performed during 0.25 to 0.75 T in the period T of one frame, and the recharging may be performed during 0.5 to 1 T in the period T of one frame.

Figure 16:
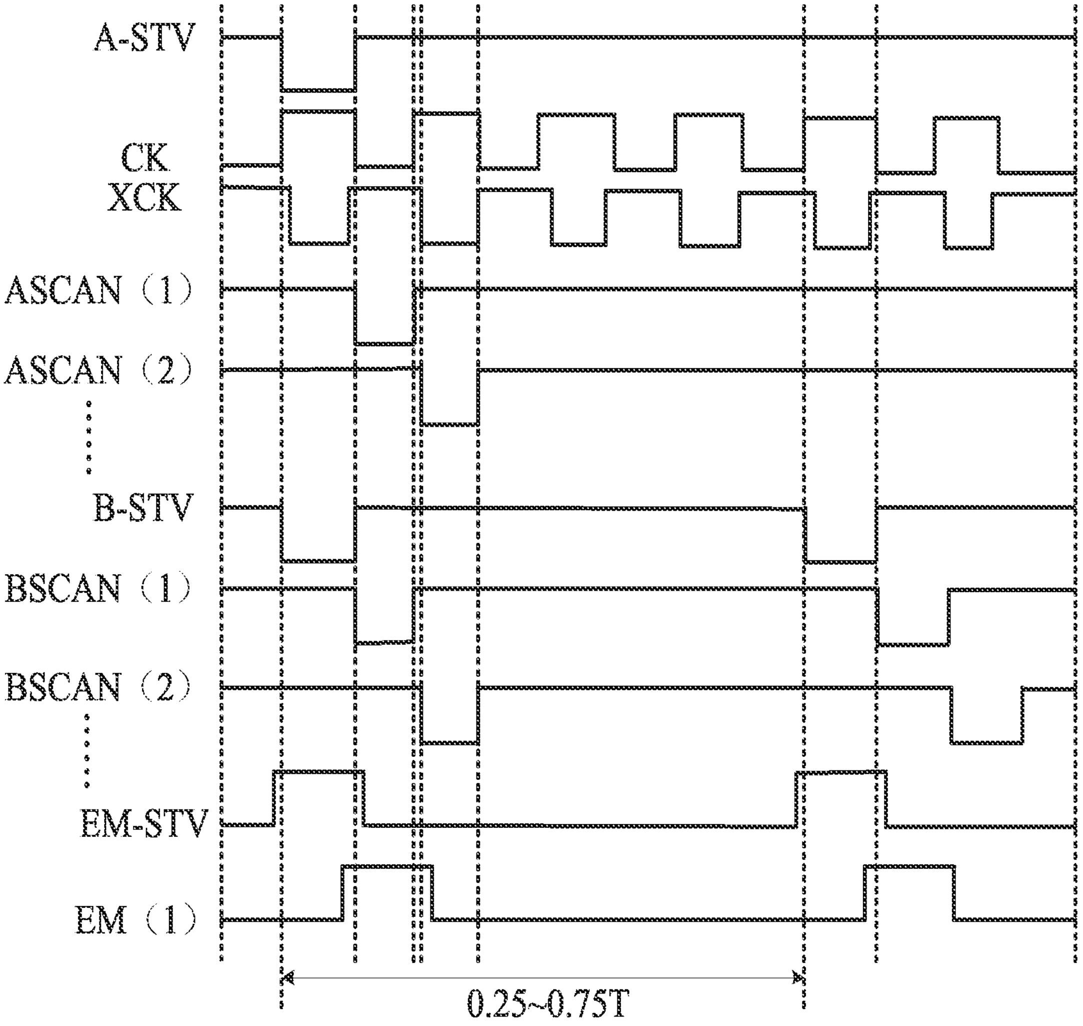
FIG. 16 is another timing diagram of a display panel provided in an embodiment of the present application.

In one embodiment, as shown in FIG. 16, the first GOA circuit can generate corresponding scan signals of group A under the control of the start signal A-STV of group A, the clock signal CK and the clock signal XCK. The second GOA circuit can generate corresponding scan signals of group B under the control of the start signal B-STV of group B, the clock signal CK and the clock signal XCK. A light-emission driving circuit can generate a corresponding light-emitting control signal, such as a first-stage light-emitting control signal EM(1), under the control of a light-emission start signal EM-STV, the clock signal CK and the clock signal XCK.

When the first-stage scan signal ASCAN (1) of group A is at low level, the first reset transistor T4 is switched on such that the potential of the gate of the drive transistor T1 is reset. At this time, the first-stage scan signal BSCAN (1) of group B is also at low level. When both the second-stage scan signal ASCAN (2) of group A and the second-stage scan signal BSCAN (2) of group B are at low level, the data signal DATA is simultaneously written to the transfer capacitor C and the storage capacitor Cst. When the second-stage scan signal BSCAN (2) of group B is at low level, the storage capacitor Cst is recharged by the electrical signals in the transfer capacitor C.

Writing the data signal DATA may be performed during 0.25 to 0.75 T in the period T of one frame, and the recharging may be performed during 0.5 to 1 T in the period T of one frame.

It should be understood that those of ordinary skill in the art may make equivalent modifications or variations according to the technical schemes and invention concepts of the present application, but all such modifications and variations should be within the appended claims of the present application.

What is claimed is:

1. A pixel circuit, comprising:

a first power line;

a second power line;

a light-emitting device and a drive transistor, connected in series between the first power line and the second power line;

a storage capacitor, electrically connected to a gate of the drive transistor;

a writing transistor, one of a source and a drain of the writing transistor electrically connected to the storage capacitor and the other one of the source and the drain of the writing transistor used to receive a data signal;

a transfer capacitor, electrically connected to the one of the source and the drain of the writing transistor;

a first switch transistor, one of the source and the drain of the first switch transistor electrically connected to the transfer capacitor and the one of the source and the drain of the writing transistor and the other one of the source and the drain of the first switch transistor electrically connected to one of the source and the drain of the drive transistor; and a second switch transistor, wherein one of the source and the drain of the second switch transistor is electrically connected to the other one of the source and the drain of the drive transistor; the other one of the source and the drain of the second switch transistor is electrically connected to the storage capacitor and the gate of the drive transistor;

wherein the gate of the writing transistor is configured to receive a first control signal; the gate of the first switch transistor is configured to receive a second control signal; the gate of the second switch transistor is configured to receive the second control signal; in a same frame, a number of effective pulses of the first control signal is less than a number of effective pulses of the second control signal, and at least one effective pulse in the second control signal is as the same as an effective pulse of the first control signal.

2. The pixel circuit according to claim 1, further comprising a third switch transistor, wherein one of the source and the drain of the third switch transistor is electrically connected to the one of the source and the drain of the first switch transistor; the other one of the source and the drain of the third switch transistor is electrically connected to the other one of the source and the drain of the first switch transistor.

3. The pixel circuit according to claim 2, further comprising a fourth switch transistor, wherein one of the source and the drain of the fourth switch transistor is electrically connected to the one of the source and the drain of the second switch transistor; the other one of the source and the drain of the fourth switch transistor is electrically connected to the other one of the source and the drain of the second switch transistor.

4. The pixel circuit according to claim 3, wherein operation phases of the pixel circuit comprise a writing phase and a light-emitting phase; the gate of the writing transistor is configured to receive a first control signal; the gate of the first switch transistor is configured to receive the first control signal; the gate of the second switch transistor is configured to receive the first control signal; the gate of the third switch transistor is configured to receive a third control signal; the gate of the fourth switch transistor is configured to receive the third control signal; in a same frame, an effective pulse of the first control signal is in the writing phase and the effective pulse of the third control signal is in the light-emitting phase.

5. The pixel circuit according to claim 1, further comprising a first light-emitting control transistor, wherein one of the source and the drain of the first light-emitting control transistor is electrically connected to the one of the source and the drain of the drive transistor and the other one of the source and the drain of the first switch transistor; the gate of the first light-emitting control transistor is configured to receive a light-emitting control signal.

6. The pixel circuit according to claim 5, further comprising a second light-emitting control transistor, wherein one of the source and the drain of the second light-emitting control transistor is electrically connected to the other one of the source and the drain of the drive transistor and the one of the source and the drain of the second switch transistor; the gate of the second light-emitting control transistor is configured to receive the light-emitting control signal.

7. A pixel circuit, comprising:

a writing module, configured to receive a data signal;

a transfer module, connected to the writing module, configured to store the data signal for outputting a compensation signal in a light-emitting phase of the pixel circuit;

a first time-division transmission module, connected to the writing module and the transfer module, configured to transmit the data signal and the compensation signal by way of time division;

a drive module, connected to the first time-division transmission module;

a second time-division transmission module, connected to the drive module, configured to transmit the data signal and the compensation signal by way of time division; and a storing module, connected to a control end of the drive module and an output end of the second time-division transmission module, configured to store the data signal and the compensation signal in a same frame by way of time division for keeping a potential of the control end of the drive module in the light-emitting phase.

8. The pixel circuit according to claim 7, further comprising a light-emitting control module, connected to the drive module, configured to control a light-emitting circuit loop of the pixel circuit to be turned on and off based on a light-emitting control signal, wherein in the light-emitting state, the light-emitting control signal controls the light-emitting control module to be in an off state and the pixel circuit controls the compensation signal to be written to the storing module.

9. The pixel circuit according to claim 8, wherein the writing module comprises a writing transistor; one of a source and a drain of the writing transistor is configured to receive the data signal; the other one of the source and the drain of the writing transistor is connected to the transfer module and the first time-division transmission module; a gate of the writing transistor is configured to receive a first control signal.

10. The pixel circuit according to claim 9, wherein the transfer module comprises a transfer capacitor; a first end of the transfer capacitor is connected to the other one of the source and the drain of the writing transistor; a second end of the transfer capacitor is configured to receive a first power-supply signal.

11. The pixel circuit according to claim 10, wherein the first time-division transmission module comprises a first time-division transmission transistor; one of the source and the drain of the first time-division transmission transistor is connected to the first end of the transfer capacitor; the other one of the source and the drain of the first time-division transmission transistor is connected to the drive module; the gate of the first time-division transmission transistor is configured to receive a second control signal; in a same frame, a number of effective pulses of the first control signal is less than a number of effective pulses of the second control signal, and at least one effective pulse in the second control signal is as the same as an effective pulse of the first control signal.

12. The pixel circuit according to claim 11, wherein the drive module comprises a drive transistor; one of the source and the drain of the drive transistor is connected to the other one of the source and the drain of the first time-division transmission transistor; the other one of the source and the drain of the drive transistor is connected to an input end of the second time-division transmission module.

13. The pixel circuit according to claim 12, wherein the second time-division transmission module comprises a second time-division transmission transistor; one of the source and the drain of the second time-division transmission transistor is connected to the other one of the source and the drain of the drive transistor; the other one of the source and the drain of the second time-division transmission transistor is connected to the gate of the drive transistor; the gate of the second time-division transmission transistor is configured to receive the second control signal.

14. The pixel circuit according to claim 13, wherein the storing module comprises a storage capacitor; a first end of the storage capacitor is connected to the gate of the drive transistor; a second end of the storage capacitor is connected to the second end of the transfer capacitor.

15. The pixel circuit according to claim 14, wherein the light-emitting control module comprises a first light-emitting control transistor and a second light-emitting control transistor;

one of the source and the drain of the first light-emitting control transistor is connected to the second end of the storage capacitor; the other one of the source and the drain of the first light-emitting control transistor is connected to the one of the source and the drain of the drive transistor; the gate of the first light-emitting control transistor is configured to receive the light-emitting control signal;

one of the source and the drain of the second light-emitting control transistor is connected to the other one of the source and the drain of the drive transistor; the gate of the second light-emitting control transistor is configured to receive the light-emitting control signal.

16. The pixel circuit according to claim 10, wherein the first time-division transmission module comprises a first transistor and a second transistor;

one of the source and the drain of the first transistor is connected to one of the source and the drain of the second transistor and the first end of the transfer capacitor; the other one of the source and the drain of the first transistor is connected to the other one of the source and the drain of the second transistor and an input end of the drive module;

the gate of the first transistor is configured to receive the first control signal; the gate of the second transistor is configured to receive a third control signal; in a same frame, an effective pulse of the first control signal is in a writing phase and the effective pulse of the third control signal is in the light-emitting phase.

17. The pixel circuit according to claim 16, wherein the second time-division transmission module comprises a third transistor and a fourth transistor;

one of the source and the drain of the third transistor is connected to one of the source and the drain of the fourth transistor and an output end of the drive module; the other one of the source and the drain of the third transistor is connected to the other one of the source and the drain of the fourth transistor and the control end of the drive module;

the gate of the third transistor is configured to receive the first control signal; the gate of the fourth transistor is configured to receive the third control signal.

18. A display panel, comprising the pixel driving circuit according to claim 1.

* * * * *